Sept. 18, 1923.
J. P. LAVOIE
1,468,413
DRIVING MECHANISM
Original Filed April 21, 1921  2 Sheets-Sheet 1
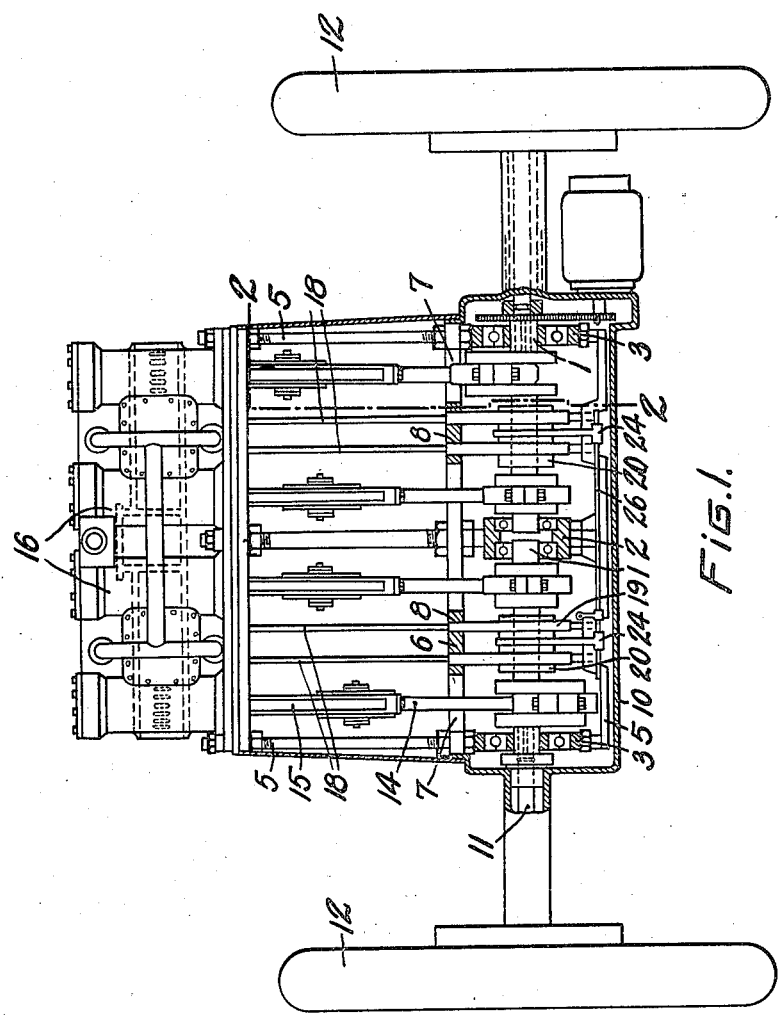
Inventor
J.P. Lavoie
Attorney Sept. 18, 1923.
J. P. LAVOIE
1,468,413
DRIVING MECHANISM
Original Filed April 21, 1921  2 Sheets-Sheet 2
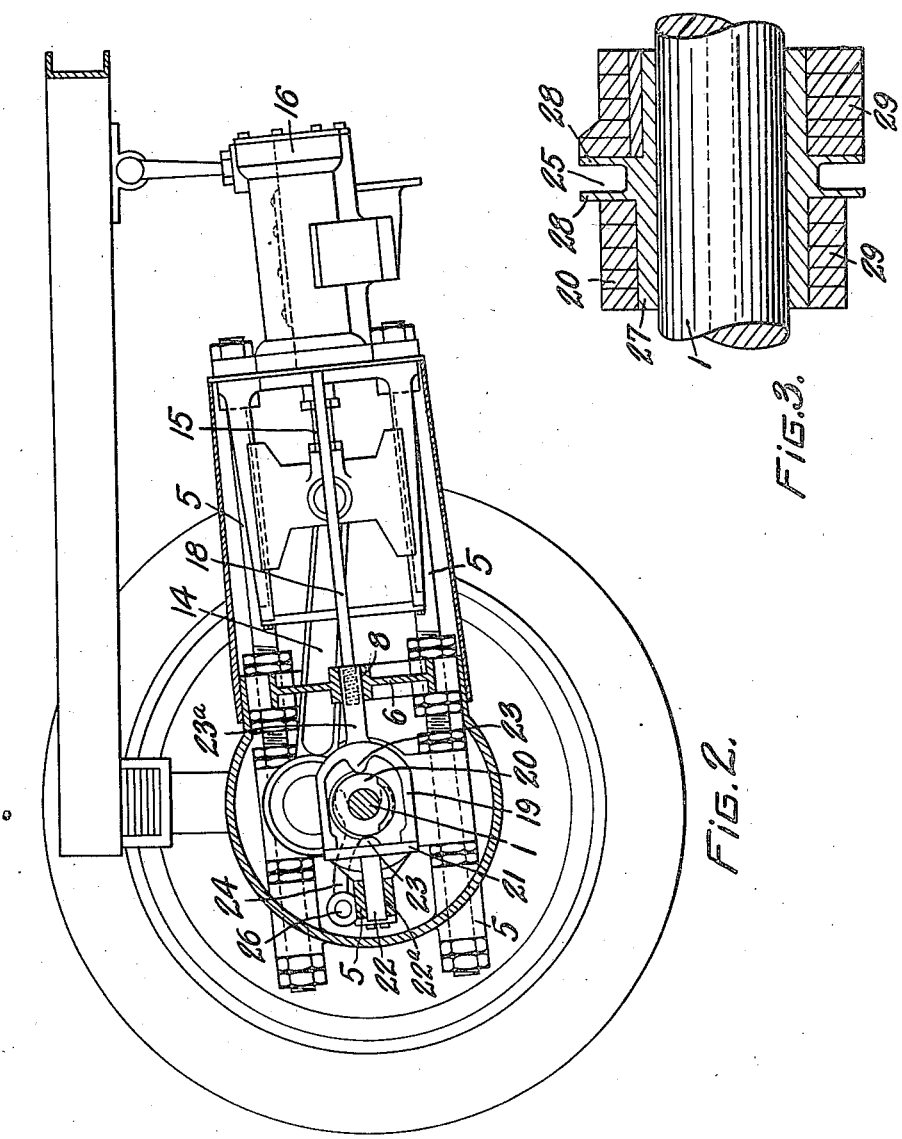
Inventor
J.P. Lavoie
By
Attorney Patented Sept. 18, 1923.

1,468,413

UNITED STATES PATENT OFFICE.

JOSEPH PIERRE LAVOIE, OF MONTREAL, QUEBEC, CANADA.

DRIVING MECHANISM.

Original application filed April 21, 1921, Serial No. 463,172. Divided and this application filed April 3, 1922. Serial No. 549,142.

*To all whom it may concern:*

Be it known that I, JOSEPH PIERRE LAVOIE, a British subject, residing at Montreal, Quebec, Canada, have invented certain new and useful Improvements in Driving Mechanism, of which the following is a specification.

The present invention relates to improvements in driving mechanisms, more particularly in a rear axle drive of the type shown and described in my prior application, Serial No. 463,172, filed April 21, 1921, of which this case is a division. The invention essentially involves the provision of an improved cam construction, the cam being mounted on the crank shaft or axle, or analogous device, and shiftable laterally thereon to adjust its position with respect to the valve rod or other element with which it is designed to coact. The invention also resides in the provision of an extremely simple and efficient driving mechanism embodying a cam construction of the above-described character.

The accompanying drawing shows one form which the invention may take in practice, the invention being represented as applied to a rear axle drive, as in my above-identified earlier case.

In the drawings:

Figure 1 is a fragmental view, partly in plan and partly in horizontal section, showing the invention in use.

Fig. 2 is an enlarged vertical section on line 2—2 of Fig. 1.

Fig. 3 is a transverse section through the cams.

Referring more particularly to the drawing, 1 indicates the crank shaft or analogous element on which the hereinafter-described cams are mounted. In the construction illustrated, the crank shaft or the like comprises two independent sections disposed in axial alinement, and there will be one of the cams for each of these sections. The shaft sections are suitably supported and journaled in a central bearing 2 in which their confronting inner ends are received, and side bearings 3. The outer ends of the sections project slightly beyond these bearings 3 to permit their connection, in the present instance, with the axle sections 11 whereon the wheels 12 are mounted; but it will be understood that the axle sections and wheels may be omitted when the invention is applied to a construction other than that shown. The bearings 2 and 3 are supported in a rectangular skeleton frame 5.

Across the frame 5 is rigidly secured a transverse bar 6; and where the drive is applied to an automobile axle, as in the arrangement illustrated, this transverse bar 6 will be provided with openings 7 for the connecting rods 14 to project therethrough, and with openings 8 for the valve rods 18. The invention is preferably used in connection with a multi-cylinder engine 16 having the usual valves (not shown) associated with the individual cylinders, and the valve rods 18 are intended to actuate these valves in the ordinary way through the intermediary of the cams. The pistons which work in the engine cylinders are likewise omitted as not being involved in the invention, and their rods 15 are joined to the connecting rods 14 previously mentioned, the latter being connected to the shaft sections 1 in the ordinary manner. The frame 5, when the invention is applied to an automobile, is secured by any convenient means to the chassis and is enclosed in a suitable casing or housing 10 which also encloses the shaft sections and has suitable side extensions to enclose the axle sections, which latter may be locked to the shaft sections in any desired way.

When the supporting element 1 constitutes the crank shaft of an engine, as in the arrangement illustrated, each section will be offset; and the two offset portions will preferably be disposed at 180° to each other, each section being turned by its respective connecting rod 14, as previously stated. All of the foregoing parts are, or may be, of the usual construction or of any preferred construction. They are not essentially involved in the precise invention forming the subject of the present divisional case and which will now be described.

Referring to Figs. 2 and 3, each section of the crank shaft or other supporting and driving element 1 carries a cam 20 which is movable horizontally thereon by means of a forked shifter arm 24. In the construction illustrated, there are of course two shaft sections, and each section has suitably keyed to it a sleeve 27 provided with a central, annular flange 28 which is recessed to form a circumferential groove 25. There is a shifter arm, therefore, for each sleeve, and the forked portion thereof engages in the corresponding groove 25. The two arms are rigidly mounted on a horizontal rod 26 which is shiftable endwise to adjust the position of the two sleeves 27 simultaneously to the same extent and in the same direction. Any suitable device can be utilized for the purpose just stated.

The cams 20, as illustrated, are preferably arranged in pairs, each pair mounted on one of the sleeves 27 at opposite sides of the annular flange 28. The cams themselves preferably consist of a plurality of individual sections or members 29; (see Fig. 3.)

The cams are preferably utilized in conjunction with the valve rods 18 to operate the latter, and, hence, the cylinder valves. Each valve rod 18 is provided at its end with a horizontal, or substantially horizontal, yoke 19 which straddles one of the cams and has its open end closed by a vertical bar 21. The bar 21 is extended to provide a guide pin 22 which is preferably formed integral therewith and which is slidably engaged in a hole 22ª formed transversely through the rear bar of frame 5. On each yoke 19 and its bar 21 are provided two contact lugs 23 which are adapted to engage the cams 20 and to be operated thereby; and opposite each guide pin 22 there is provided an arm 23ª which extends through the corresponding opening 8 in the cross bar 6 and in the end of which the valve rod 18 is secured. By reason of this construction, the yoke will be properly guided and the valve rod will always be centered.

In operation, the shaft 1 or the like is rotated—in the present instance, by means of the engine or motor—through the connecting rods 14; and this rotary movement is imparted to the cams 20 and is transmitted by the latter through the yokes 19 and the valve rods 18 to the valves. Operation of the shifting rod 26 in either direction will move both pairs of cams simultaneously, through the medium of the shifting arms 24 and the grooved sleeves 27 with which said arms are engaged. Movement of the cams will vary the timing of the operations of the valves.

I claim as my invention:

1. In combination a rotary driving element; a sleeve keyed to said element to rotate therewith and to slide laterally thereon, said sleeve having a central, circumferential flange which is peripherally grooved; a pair of cams provided on said sleeve, one cam on each side of said flange, to be shifted laterally with the sleeve; a pair of reciprocating elements each provided with a yoke which straddles the adjacent cam to be operated thereby; and a shifting device engageable in the groove in said flange to slide said sleeve in either direction along said driving element, thereby to vary the timing of the operation of the parts actuated by said reciprocating elements.

2. In combination, a rotary driving element; a cam mounted to rotate with said element and to slide laterally thereon; a reciprocating element having a yoke which straddles the cam and which is provided with a bar to close the open end of the yoke; said yoke and closer bar having diametrically-opposite contact lugs for operative engagement by said cam; and a device for shifting the cam with relation to said yoke, to vary the timing of the operation of the part actuated by the reciprocating element.

3. In combination, a rotary driving element; a skeleton frame wherein the driving element is journaled, embodying end members having bearing openings for said driving element and front and rear side members having oppositely-located guide openings; a reciprocating element extending through the guide opening in the front frame member and having a yoke which straddles the cam and which is provided with a bar to close the open rear end of the yoke; said yoke and closer bar having diametrically-opposite contact lugs arranged within the confines of the yoke for operative engagement by the cam, and said closer bar having a rearwardly-extending guide pin which projects through the guide opening in the rear frame member; and a device for shifting the cam with relation to said yoke, to vary the timing of the operation of the part actuated by the reciprocating element.

In testimony whereof I affix my signature.

JOSEPH PIERRE LAVOIE.